(12) United States Patent
Trevathan et al.

(10) Patent No.: US 11,113,047 B2
(45) Date of Patent: Sep. 7, 2021

(54) SYSTEMS AND PROCESSES OF ACCESSING BACKEND SERVICES WITH A MOBILE APPLICATION

(71) Applicant: Kony, Inc., Orlando, FL (US)

(72) Inventors: Matthew B. Trevathan, Roswell, GA (US); Matthew Terry, Celebration, FL (US); Destry Gustin, Oviedo, FL (US); Keith Katz, Orlando, FL (US); Edward Gross, Orlando, FL (US); Bjorn Hildahl, Orlando, FL (US); Amit Aghara, Orlando, FL (US)

(73) Assignee: KONY, INC., Orlando, FL (US)

( * ) Notice: Subject to any disclaimer, the term of this patent is extended or adjusted under 35 U.S.C. 154(b) by 0 days.

(21) Appl. No.: 14/657,742

(22) Filed: Mar. 13, 2015

(65) Prior Publication Data

US 2016/0266882 A1 Sep. 15, 2016

(51) Int. Cl.
*G06F 9/44* (2018.01)
*G06F 8/71* (2018.01)
*G06F 8/61* (2018.01)

(52) U.S. Cl.
CPC . *G06F 8/71* (2013.01); *G06F 8/61* (2013.01)

(58) Field of Classification Search
CPC ........... G06F 9/45504; G06F 8/61; G06F 8/71
See application file for complete search history.

(56) References Cited

U.S. PATENT DOCUMENTS

| | | | | |
|---|---|---|---|---|
| 8,205,000 B2* | 6/2012 | Chang | ..................... | H04L 41/12 709/230 |
| 8,613,070 B1* | 12/2013 | Borzycki | ................ | H04L 67/10 726/8 |
| 2012/0311524 A1* | 12/2012 | Chen | ..................... | G06F 16/958 717/104 |
| 2013/0086627 A1* | 4/2013 | Bryan | ..................... | H04L 63/10 726/1 |
| 2013/0151317 A1* | 6/2013 | Charfi | ................ | G06Q 30/0241 705/7.36 |
| 2013/0263083 A1* | 10/2013 | Reddy | ........................ | G06F 8/41 717/106 |
| 2014/0032691 A1* | 1/2014 | Barton | ................... | G06F 21/604 709/206 |
| 2014/0109072 A1* | 4/2014 | Lang | .......................... | G06F 8/65 717/168 |
| 2015/0381621 A1* | 12/2015 | Innes | ................... | H04L 63/0884 726/7 |
| 2016/0092348 A1* | 3/2016 | Straub | ........................ | G06F 8/61 717/124 |
| 2016/0205139 A1* | 7/2016 | Davies | .............. | H04W 12/0027 726/1 |

* cited by examiner

*Primary Examiner* — Chat C Do
*Assistant Examiner* — Lenin Paulino
(74) *Attorney, Agent, or Firm* — Andrew M. Calderon; Roberts Calderon Safran & Cole, P.C.

(57) ABSTRACT

Systems and processes of accessing selected backend services throughout a software development lifecycle with a singly deployable mobile application is provided. The method includes deploying a mobile application a single time on a mobile device during a development lifecycle. The method further includes providing the singly deployed mobile application access to different service endpoint destinations during the development lifecycle based on one or more application policies associated with at least the mobile application.

22 Claims, 5 Drawing Sheets

SYSTEMS AND PROCESSES OF ACCESSING BACKEND SERVICES WITH A MOBILE APPLICATION

FIELD OF THE INVENTION

The invention relates to mobile applications and, more particularly, to systems and processes of accessing selected backend services throughout a software development lifecycle with a singly deployable mobile application.

BACKGROUND OF THE INVENTION

Global development has reintroduced the client/server model back into the world of development. Unlike traditional websites, mobile applications require themselves to be installed on a device during the testing process. However, it is difficult to run multiple versions of an application on a single device thus requiring developers to create a new deployable version of their application through the QA (quality assurance) process. This is because the application needs to talk to different backend servers throughout the software lifecycle.

Due to the current practice of redeploying different versions of an application through the QA, developers need to recompile the application code during each deployment of the application throughout the testing and release process. This can be problematic if there are a limited number of devices that can be used during the development process or if there are bugs that have been detected in production that may relate to the application on the phone or to a specific device that needs to be tested quickly without requiring a new build.

By way of further examples, the problems with current software delivery lifecycle and testing mobile applications are as follows:

(i) If there is a client-side problem in production with a specific building code, the application must be redeployed on the device. This process may not work well when testing the wild or rolling back a client-side application into a QA or staging environment.

(ii) The current testing process does not allow a single client application to move its way through the system without being rebuilt when only backend changes are made for testing purposes.

(iii) A device cannot follow the build process through the testing process using a single client code base without recompiling.

Also, currently, using a single application throughout the software deployment process through the application lifecycle has not been achieved in the mobile space. Commonly, development and operations (also known as dev ops) have to leverage properties files to deploy a single code base that follows deployment through the application lifecycle. This is not effective for mobile applications since the development and operations team cannot manipulate properties files directly on the device after the deployment. Neither do they want to give the option to point an application to a different backend within a menu that can be manipulated by the end-user.

SUMMARY OF THE INVENTION

In a first aspect of the invention, a method comprises deploying a mobile application a single time on a mobile device during a development lifecycle. The method further comprises providing the singly deployed mobile application access to different service endpoint destinations during the development lifecycle based on one or more application policies associated with at least the mobile application.

In another aspect of the invention, a computer program product comprises a computer readable storage medium having program instructions embodied therewith. The computer readable storage medium is not a transitory signal per se, and the program instructions are readable by a computing device to cause the computing device to perform a method comprising: receiving identification information of a mobile device deploying a mobile application; returning a token based on the identification information received from the mobile device deploying the mobile application; receiving at least one of the token and context from the mobile device; and providing service endpoint definitions based on the at least one of the token and context to allow access by the mobile application to selected end point definitions during different stages of development lifecycle.

In yet another aspect of the invention, a system comprises a CPU, a computer readable memory and a computer readable storage medium. The system comprises program instructions to deploy a mobile application on a mobile device. The system comprises program instructions to direct the mobile application to different endpoint destinations during a software development lifecycle based on application policies associated with the mobile application. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
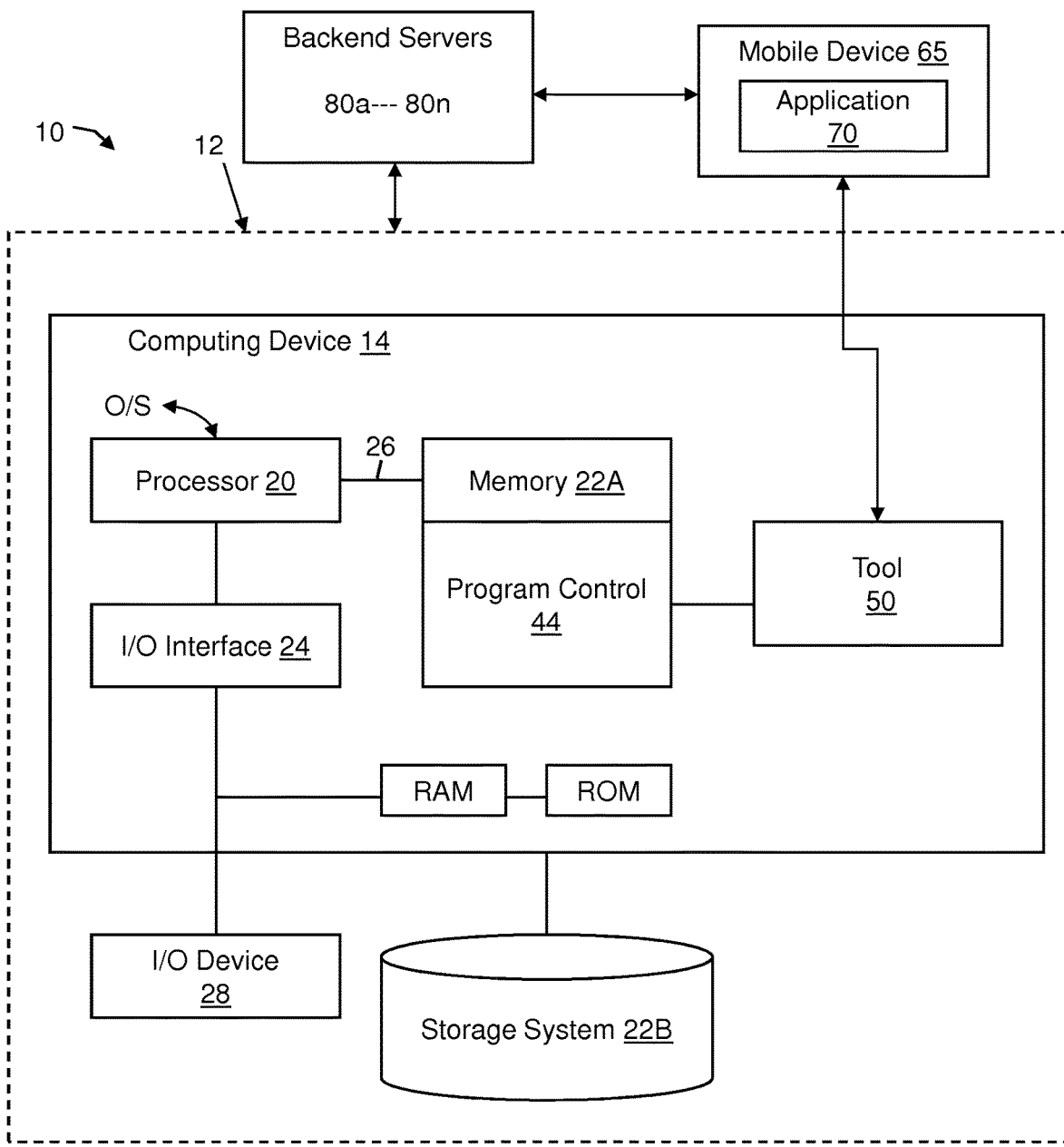
FIG. 1 shows an illustrative environment for managing the processes in accordance with the invention.

The invention relates to mobile applications and, more particularly, to systems and processes of accessing selected backend services throughout a software development lifecycle with a singly deployable mobile application. In more specific embodiments, the systems and processes described herein leverage a policy management system of enterprise mobility management (EMM) to allow a single deployment of a mobile application during a development lifecycle, with the ability to change endpoint destinations of the mobile application based on, e.g., an application policy including time of day, location, mobile application type or other context, or device ID.

Advantageously, in the systems and processes described herein the application can be pointed to various backend systems (e.g., QA servers, staging servers, production servers, etc.) with a single deployment of the application by using different application policies which allow different users, applications, etc. to access different services through the development lifecycle. These application policies can be based on context, e.g., time of day, location, mobile application type or other administrator designed application policies or other context, as well as, for example, user information or device ID. For example, the systems and processes described herein allow a development and operations team to deploy the application a single time, and allow the application to access different services during the development lifecycle by designating specific users, time of day, location or other context to point the particular mobile application to a specific backend set of services (servers) during different stages of the development lifecycle. In this way, it is possible to use a single deployed mobile application throughout the software deployment process through the application lifecycle in the mobile space, without the need to continually install, reinstall and recompile code.

Thus, by implementing the systems and processes described herein it is now possible to have a single client application:

(i) be deployed a single time on the mobile device even when there is a client-side problem in production with a specific building code;

(ii) move its way through the system without being rebuilt when only backend changes are made for testing purposes; and/or (iii) follow the build process through the testing process using a single client code base without recompiling.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage medium of expression having computer-usable program code embodied in the medium. The computer-usable or computer-readable medium is not a transitory signal per se, and is any tangible medium that can contain and store the program for use by or in connection with an instruction execution system, apparatus, or device.

FIG. 1 shows an illustrative environment 10 for managing the processes in accordance with the invention. The environment 10 includes a server 12 or other computing system. The server 12 can be representative of an enterprise mobility management (EMM) server or policy server that stores data in a storage system 22B. In embodiments, the server 12 can also be representative of an identification manager, which may be a separate or same computing device as the enterprise mobility management (EMM) server or policy server.

In embodiments, the server 12 is accessible by users of mobile computer device(s) 65, which are in communication with different backend services (e.g., QA servers, staging servers, production servers, etc.) used during the software development lifecycle, as shown representatively at reference numerals 80a ... 80n. The mobile computer device 65 can also communicate directly with any of the server 12 during the software development lifecycle in order to obtain certain application policies (which would direct the mobile application to different end point destinations) or end point destinations based on certain policies. As used herein, a mobile device 65 refers to a smartphone, tablet computer, personal digital assistant, or similar computing device that includes a mobile operating system, wireless communication antenna, processor, user interface, memory, etc.

In embodiments, the server 12 can be a standalone server, which implements the processes of the present invention within a networking environment. The server 12 and backend services 80a ... 80n and/or processes performed by the server 12 and backend services 80a ... 80n can be integrated into the networking environment of any enterprise. The server 12 (and backend services 80a ... 80n) includes a computing device 14 which can be resident on a network infrastructure or computing device. The computing device 14 (and backend services 80a ... 80n) includes a processor 20 (e.g., a CPU), a memory 22A, an I/O interface 24, and a bus 26. The bus 26 provides a communications link between each of the components in the computing device 14. In addition, the computing device 14 includes a random access memory (RAM), a read-only memory (ROM), and an operating system (O/S). The computing device 14 is in communication with the external I/O device/resource 28 and a storage system 22B. The I/O device 28 can comprise any device that enables an individual to interact with the computing device 14 (e.g., user interface) or any device that enables the computing device 14 to communicate with one or more other computing devices (e.g., devices 65, etc.) using any type of communications link.

The processor 20 executes computer program code (e.g., program control 44), which can be stored in the memory 22A and/or storage system 22B. In embodiments, the program control 44 of the computing device 14 of the server 12 controls an application policy tool 50, which comprises program code that is adapted to perform one or more of the processes described herein. The application policy tool 50 can be implemented as one or more program code in the program control 44 stored in memory 22A as separate or combined modules. Additionally, the application policy tool 50 may be implemented as separate dedicated processors or a single or several processors to provide the functions described herein. While executing the computer program code, the processor 20 can read and/or write data to/from memory 22A, storage system 22B, and/or I/O interface 24. In this manner, the program code executes the processes of the invention.

The program code can include computer program instructions that are stored in a computer readable storage medium. The computer program instructions may also be loaded onto a computer, other programmable data processing apparatus, or other devices to cause a series of operational steps to be performed on the computer. Moreover, any methods provided herein in the form of flowcharts, block diagrams or otherwise may be implemented using the computer program instructions, implemented on the computer readable storage medium.

The computer readable storage medium comprises any non-transitory medium per se, for example, such as electronic, magnetic, optical, electromagnetic, infrared, and/or semiconductor system. More specific examples (a non-exhaustive list) of the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

According to aspects of the invention, the application policy tool 50 communicates with a mobile device 65. The application policy tool 50 can store different policies for different mobile applications, users, etc., and provide the application policies (or directly the end point destinations) directly to a mobile application 70 on the mobile device 65 in order to access different backend systems based on the application policies, e.g., context such as time of day, user, location etc., or device ID (which is registered with the policy application tool or policy server, etc. In embodiments, the application policy tool 50 can also provide endpoint destinations directly to the mobile device 65, based on device ID (which is associated with a particular application policy for the device ID), for example.

In more specific embodiments, the application policy tool 50 allows an application 70 to be deployed to the mobile device 65 a single time during a development lifecycle, while providing the ability to change endpoint destinations of the application 70 during any stage of development lifecycle based on an application policy for the deployed application, e.g., time of day, location or other context, provided by the application policy tool 50. For example, the different application policies can allow the application 70 access to a QA server, a staging server or a production server, etc. This can be accomplished by providing program code, e.g., application policies, to the mobile device 65, which may include end point destinations or policies allowing the mobile application to be directed to end point destinations (when the end point destinations are locally stored on the application) as described with more detail in FIGS. 3-5.

By way of more specific example, once the application 70 is deployed, a user can log into the application 70, which would be automatically directed to the proper backend services based on the application policy for that user. This can be achieved by identifying the user, sending a user token and optional context to the policy server (e.g., computing device 14) which establishes which backend servers (services) that the application can talk to based on application policies from the application policy tool 50. In embodiments, the application policies or end point destinations can be stored locally, e.g., on the mobile device 65, or with an additional layer of security, on the policy server, e.g., computing device 14 which comprises the application policy tool 50. In the former scenario, a policy can be obtained which will then direct the mobile application to the end point destinations (based on the policy associated with, e.g., location of the device, time of day, application type or other context or identification information).

In even more specific embodiments, a user of the mobile device 65 can log into the application 70. At login, the application policies are dynamically applied through the use of dynamic URLs (e.g., similar to the functionality of a redirect). The URLs can be hard coded, with the application policy applying the correct hard coded set. In embodiments, the application policies can be applied based on several options as shown in the flow diagrams described herein such as context aware routing, for example, based on latency, time, position, etc.

In additional or alternative embodiments, an application 70 may direct the user to various backend systems without the use of identity, based on context only. For instance, an application 70 may not require a login, but the application may choose its endpoints based on its context. In the case of testing, for example, a user may be testing from a specific facility, using a specific device that is registered as a testing device, and/or using the application during specific hours of the day. In this example, the user's identity is not needed by, e.g., an identity manager, but only the context in which the user operates is sent to the policy server (e.g., computing device 14) from the application to determine which endpoints they are to use. In this scenario, the device ID becomes the unique identifier if needed, and the policy administrator can change the endpoints by redefining the application policy for the device ID rather than the user, itself. This is a powerful construct since it allows testers to keep the same device throughout the testing process but move it from environment to environment using the same application code base.

Figure 2:
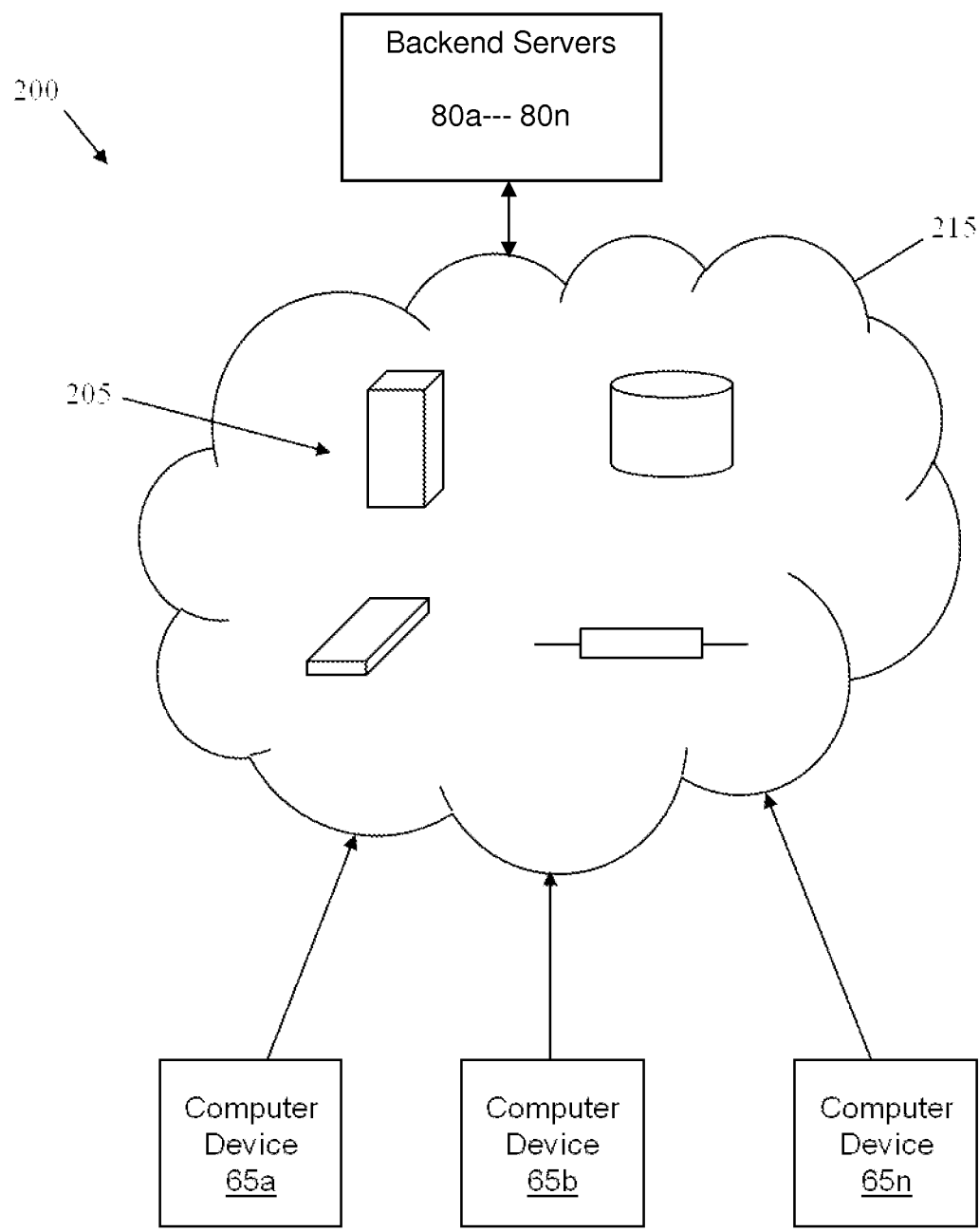
FIG. 2 shows an exemplary cloud computing environment in accordance with aspects of the invention.

FIG. 2 shows an exemplary cloud computing environment 200. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with a service provider. In embodiments, one or more aspects, functions and/or processes described herein may be performed and/or provided via cloud computing environment 200.

As depicted in FIG. 2, cloud computing environment 200 includes cloud resources 205 that are made available to client devices 65a . . . n and backend services (servers) 80a . . . 80n via a network 215, such as the Internet. In embodiments, using the cloud, the client devices 65a . . . n can deploy the application a single time, but can be directed to different backend systems 80a . . . 80n based on different application policies, as described herein. In this way, it is no longer necessary to run multiple versions of an application on a single device which would require developers to create a new deployable version of their application through the QA (quality assurance) process. Moreover, by implementing the systems and processes herein, the application can talk to different backend servers throughout the software lifecycle, without the need for requiring a new build which requires recompiling, etc. In addition, by implementing the systems and processes herein, the testing process allows a single client application to move its way through the system without being rebuilt when only backend changes are made for testing purposes. And, a device or application can now follow the build process through the testing process using a single client code base without recompiling.

Cloud resources 205 can include a variety of hardware and/or software computing resources, such as servers, databases, storage, networks, applications, and platforms as shown, for example, in FIG. 1. Cloud resources 205 may be on a single network or a distributed network across multiple cloud computing systems and/or individual network enabled computing devices. Client devices 65a . . . n may comprise any suitable type of network-enabled computing device, such as handheld computers (e.g., smartphones, tablet computers or other platforms). Cloud resources 205 are typically provided and maintained by a service provider so that a client does not need to maintain resources on a local client device 65a . . . n. In embodiments, cloud resources 205 may include one or more computing system 14 and/or server 12 of FIG. 1 that is specifically adapted to perform one or more of the functions and/or processes described herein.

Cloud computing environment 200 may be configured such that cloud resources 205 provide computing resources to client devices 65a . . . n through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 65a . . . n. For example, cloud resources 205 can provide both SaaS and IaaS to a client device 65a . . . n. Cloud computing environment 200 may be configured such that cloud resources 205 provide computing resources to client devices 65a . . . n through a variety of deployment models, such as any combination of public, private, community, hybrid, and/or any other cloud deployment model.

One or more cloud resources 205 may be structured in multiple layers or functional abstraction layers, e.g., a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

Flow Diagrams

Figure 3:
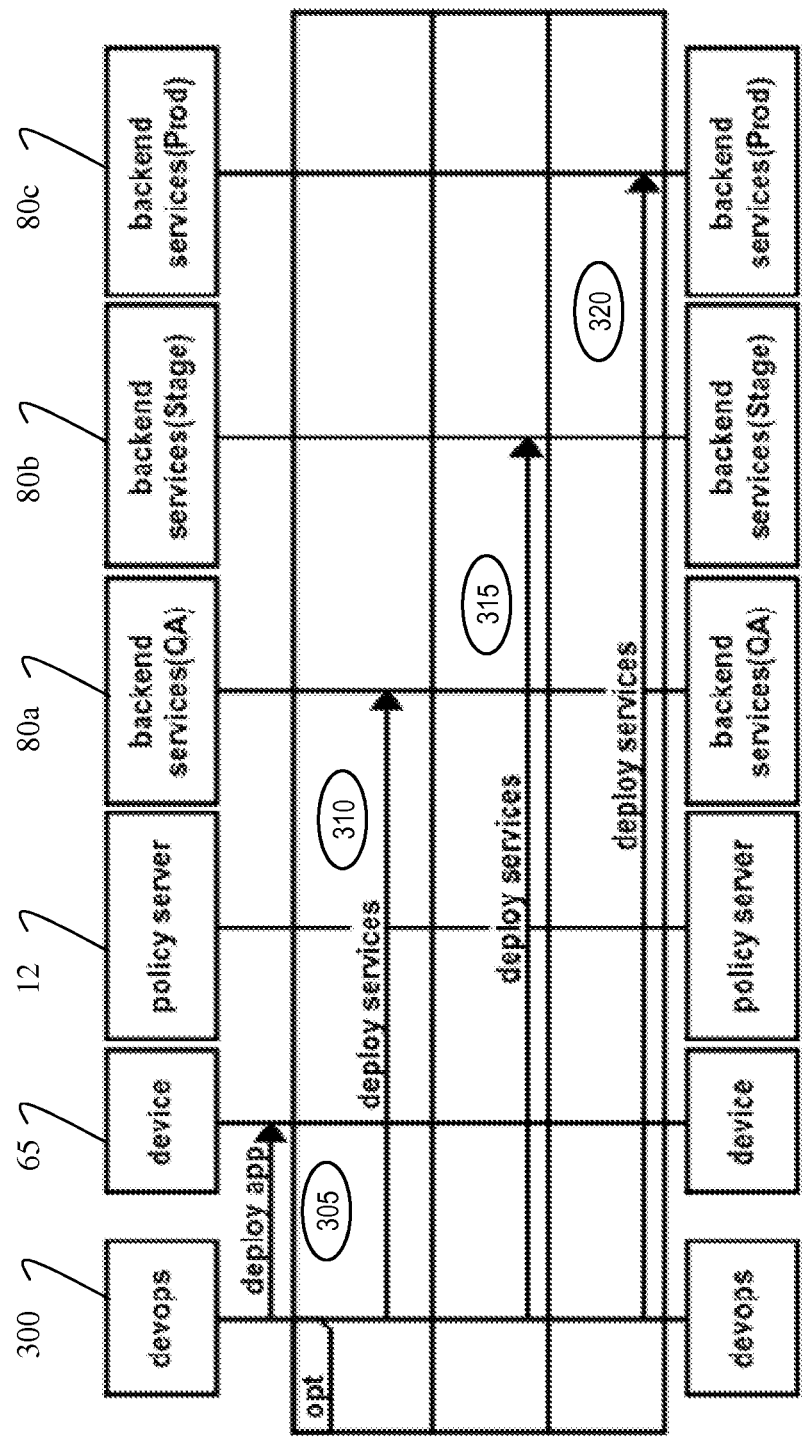
FIGS. 3-5 show flow diagrams of methods in accordance with aspects of the invention.
Figure 4:
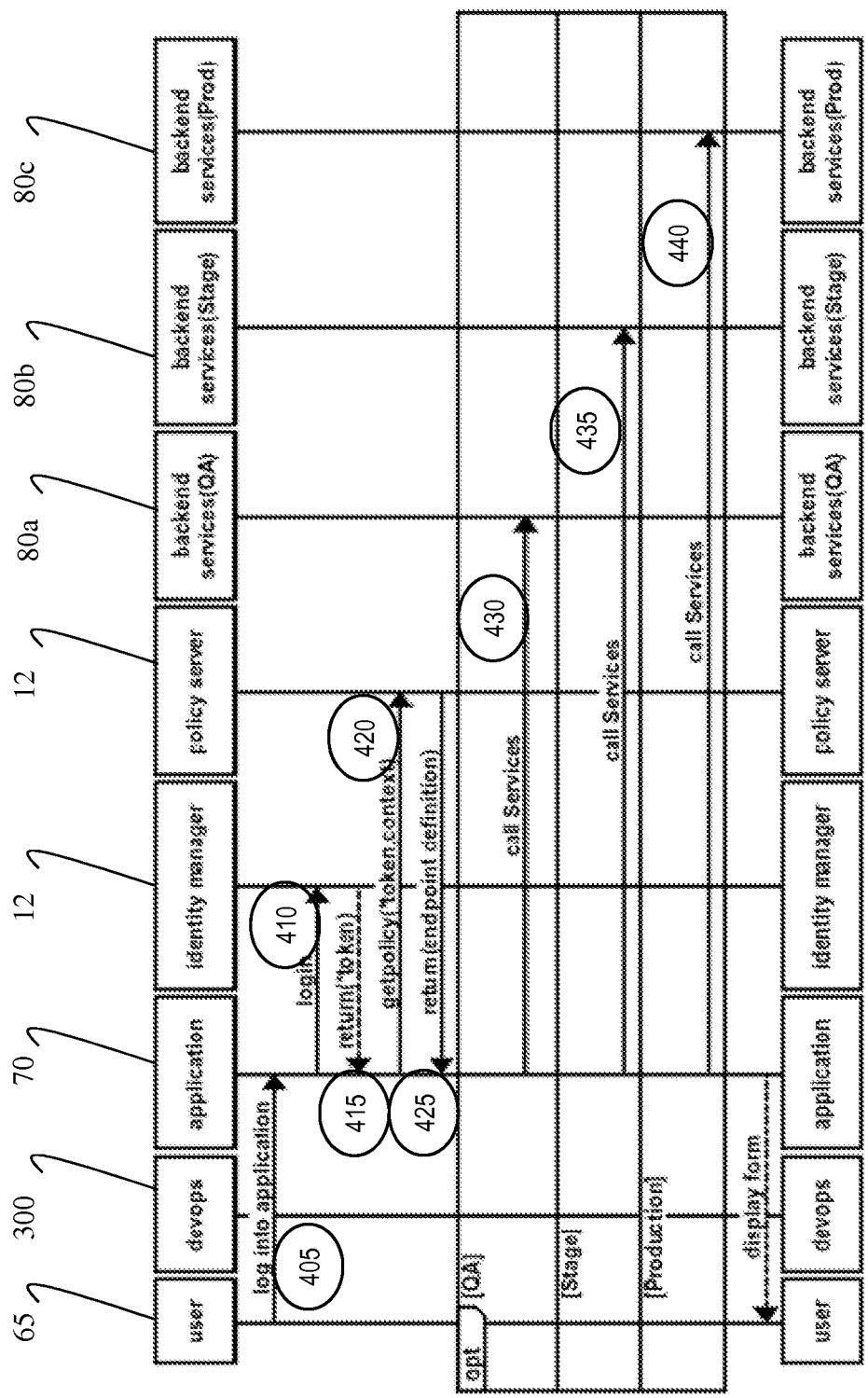
Figure 5:
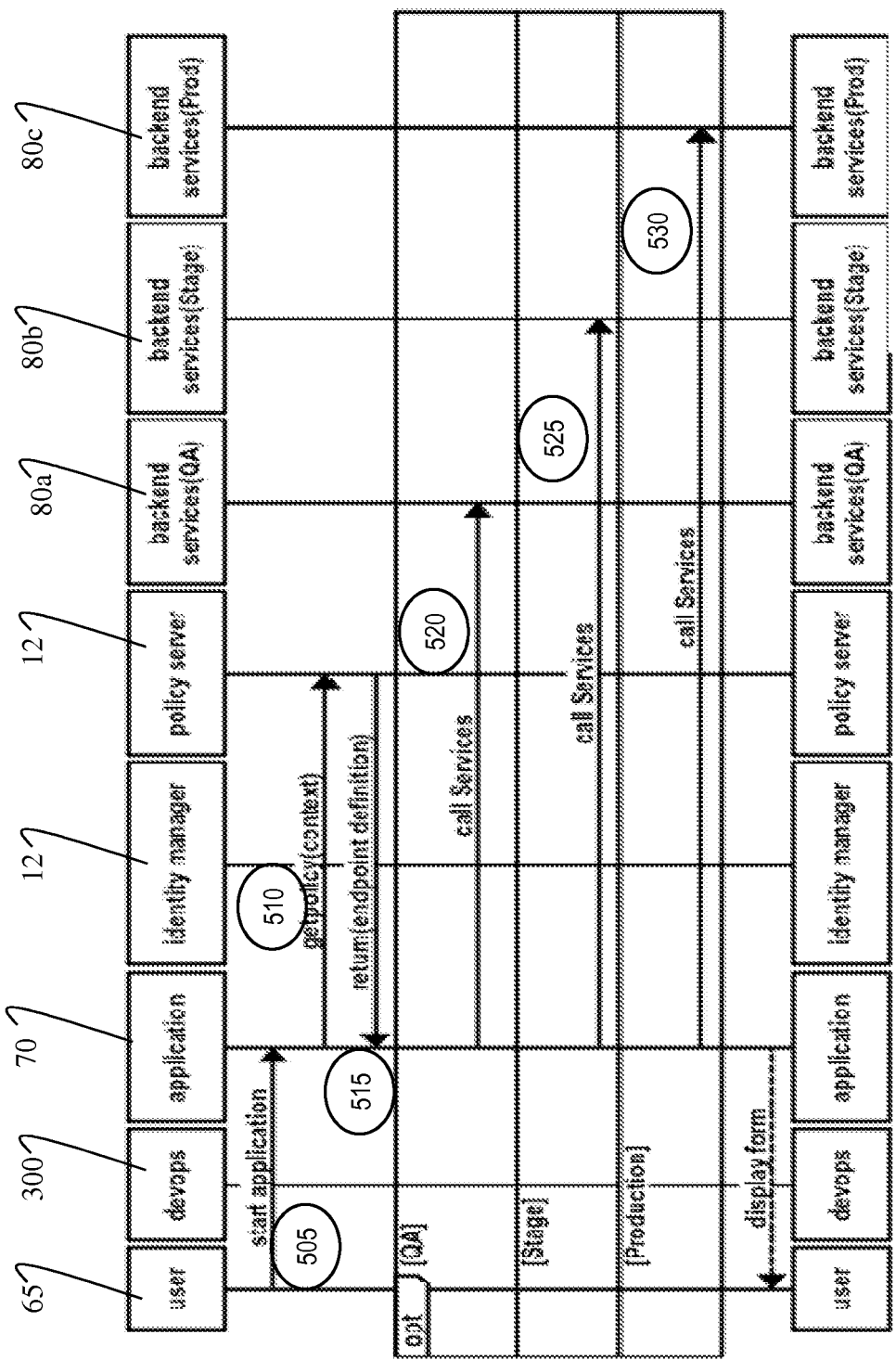

FIGS. 3-5 show flow diagrams (e.g., sequence diagrams or swim lane diagrams) implementing aspects of the present invention. The flow diagrams may equally represent a high-level block diagram or a swim-lane diagram of the invention. The steps of the flow diagrams may be implemented and executed, for example, from either a server, in a client-server relationship, or they may run on a user workstation with operative information conveyed to the user workstation. Furthermore, steps of the processes of the invention may be implemented using a computer-readable storage medium having program code for use by or in connection with a computer or any instruction execution system. The software and/or computer program product can be implemented in the environments of FIGS. 1 and 2.

FIG. 3 shows a flow diagram of deploying an application during a development lifecycle. In the implementation of FIG. 3, the following players are shown: a development and operations (devops) team 300, a mobile device 65, a policy server (e.g., server 12 of FIG. 1), and a plurality of backend servers 80a, 80b and 80c used during the software development lifecycle, and accessible by the mobile device 65.

More specifically, in the example of FIG. 3, at step 305, a development and operations (devops) team deploys an application to a particular device. The application can be deployed with source code to access one or more of the plurality of backend servers 80a, 80b and 80c. These backend servers 80a, 80b and 80c can include, e.g., QA server, staging server and production server. In embodiments, the application may have a properties file that contains a list of all of the endpoint destinations from QA to production, and the application uses the application policy returned from the policy server to determine which endpoint destinations to use within the property files of the mobile application. The advantage here is that endpoints are stored locally. In another implementation, the application retrieves the proper endpoints from the policy server. This provides an additional layer of security since the user has to be identified or meet the proper context criteria to be sent a specific set of endpoints to communicate with. At steps 310-320, the development and operations (devops) team deploys the services to the different backend servers 80a, 80b and 80c.

In embodiments, the user can launch the application, with the application policies being dynamically applied from the server through dynamic URLs. The URLs can be hard coded with the application policy applying the correct hard coded set. Upon login to the application, the new application policies can be applied based on for example the flows shown in FIG. 4 or 5.

FIG. 4 shows a flow diagram of a deployment of the application in accordance with aspects of the invention. In the implementation shown in FIG. 4, the following players are shown: a user, e.g., mobile device 65, a development and operations (devops) team 300, a policy server and identify manager (e.g., one or more servers as represented at reference numeral 12 of FIG. 1), and a plurality of backend servers 80a, 80b and 80c used during the software development lifecycle, and accessible by the mobile device 65.

At step 405, a user logs into the application 70. At step 410, the application will send a login request to an identity manager. This login request can include identity information of the device or user. For example, the identity can be a device ID (e.g., Unique Device ID (UDID)). In embodiments, the identify manager can be a server which stores identification information of users in a storage device, e.g., storage system 22B. At step 415, the identify manager returns a token to the application, e.g., device deploying the application. At step 420, the application can then request a policy from the policy server, which would be provide access to specific endpoint destinations. The request for a policy will be accompanied by the token and/or context. The context can include, amongst other items, location of the device, user of the device, time of day, etc. In this embodiment, the application retrieves the proper endpoint definitions directly from the policy server based on the token and/or context, at step 425. In embodiments, the context can be, for example, time of day, location of device, user identification, etc. This provides an additional layer of security since the user has to be identified or meet the proper context criteria to be sent a specific set of endpoints to communicate with a particular endpoint, e.g., any of the plurality of backend servers 80a, 80b and 80c. At steps 430-440, the application can access different services, e.g., different backend servers 80a, 80b and 80c, based on the endpoints retrieved from the policy server.

In embodiments, the application may have a properties file that contains a list of all of the endpoints from QA to production. That is, the endpoints can be stored locally on the device. As the application receives the application policies from the policy server, the application can use the policy returned from the policy server to determine which endpoints can be used within the property files based on context only (without the use of identity). For instance, in the case of testing, a user may be testing from a specific facility, using a specific device that is registered as a testing device, and/or using the application during specific hours of the day. In this example, the user's identity is not obtained by the identity manager, only the context in which the user operates is sent to the policy server to determine which endpoints they are to use. In this case, the device ID becomes the unique identifier if needed, and the policy administrator can change the endpoints by redefining the policy for the device ID rather than the user itself. This is a powerful construct since it allows testers to keep the same device throughout the testing process but move it from environment to environment using the same application code base.

More specifically, as shown in FIG. 5, at step 505, a user will log into the application 70. At step 510, the application will obtain a policy directly from the policy server based on context. At step 515, the policy server will then return an endpoint destination to the application, based on the context, e.g., location, time of day, testing phase, etc. At step 520-530, the application can communicate with a particular endpoint, e.g., any of the plurality of backend servers 80*a*, 80*b* and 80*c*, based on the particular retrieved endpoint destinations at step 515.

Accordingly, by implementing the aspects described herein, it is now possible to control the deployment process of the mobile application across different environments, by specifically pointing the mobile application to selected, different environments (e.g., backend services) based on the policies associated with the singly deployed application. Thus, there is no need to continually install, uninstall, reinstall and recompile code of the mobile application at the device level during different stages of the development cycle. By allowing the mobile application to be redirected to different backend services, there is no need to change code or recompile the code for the mobile application based on problems found during different stages of the development lifecycle. Instead, the aspects of the invention dynamically change the different endpoint destinations which host different development lifecycle stages (e.g., testing staging and production) by use of policies associated with a singly deployed application to the mobile device. The use of the application policies, which can be based, e.g., on device ID, also ensures that sensitive test data, for example, is only accessible to certain users, e.g., users identified by device ID, etc., within certain environments. The aspects of the invention also allow end point services to be updated, while the application is pointed to a different service.

Illustrative Example Applications

By way of example, user 1 is called with a problem with his mobile application in production. User 1 is not near his computer, but still has access to the application on his mobile device. User 1 can call user 2 on his cellular phone (or through other communication means) and ask to be added to the testers' group. Once added to the group, user 1 can use the application on his device in the test environment to try to reproduce the same result. This is especially useful if there are other scenarios that are hard to track where the problem is occurred and by quickly allowing user 1 to connect to a different set of backend systems he can troubleshoot in a safe environment away from production.

In a second example, user 1 creates a build of his new application and wants to deploy it to a few specific devices, but test those devices throughout testing, staging and production without affecting other devices or the current code base that is on the servers. User 1 can deploy the application to specific devices one time and switch the context of where the device points to during the testing process by simply changing the policy within the policy server. This allows user 1 to produce a specifically targeted fix for a device without affecting mainline code development while allowing the user to complete the QA process with a single build of the application that ensures the final application delivered to the specific device meets the criteria throughout the process.

In yet another example, the location of the device itself and time of day may drive where the device will actually point, e.g., point to a backend server. For instance, the testing was located in India but the final user acceptance test team is located in the United States. Using the same code base, these testers can seamlessly access their environments without changing any configuration on the device using the policies given to them by the policy administrator. When the application loads, it looks at the location and policies for the individual user and properly directs to the correct backend server given the location and time of day of the user. This type of scenario helps to ensure the security of the application and connecting to its backend systems by not allowing a person to test at all, outside a specific location and time of day or pointing it to specific backend systems given their location to quickly allow them to seamlessly test in a given environment without third-party intervention.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:
1. A method, comprising:
providing a singly deployed mobile application by deploying a mobile application a single time on a mobile device during a development lifecycle of the singly deployed mobile application; and
pointing the singly deployed mobile application to selected different environments in different service endpoint destinations during the development lifecycle of the singly deployed mobile application, without recompiling, based on one or more application policies associated with at least the singly deployed mobile application,
wherein the application policies are provided to the singly deployed mobile application by a policy server in a management computing system and are based on a context in which a user operates, without the use of a user identity, wherein the singly deployed mobile application includes a properties file, stored locally on the mobile device, that contains a list of the service endpoint destinations to allow direct access by the mobile device to the different service endpoint destinations during the development lifecycle of the singly deployed mobile application using the properties file, wherein the direct access to the different service endpoint destinations is provided via a connection between the mobile device and the different service endpoint destinations which does not include the management computing system, wherein the singly deployed mobile application uses the application policies provided by the policy server to determine which service endpoint destinations can be used based on context only, without the use of the user identity, from the list of service endpoint destinations contained in the properties file stored locally on the mobile device, wherein the context includes at least one of time of day and location, wherein the list of the service endpoint destinations accessible by the singly deployed mobile application and included in the property files includes QA servers, staging servers, and production servers; and wherein the singly deployed mobile application moves its way through the service endpoint destinations without being rebuilt or recompiled, and further comprising redefining the application policies to change the list of service endpoint destinations that can be used by the user within the property files stored locally on the mobile device, to allow the singly deployed mobile application to directly access the changed service endpoint destinations during the development lifecycle of the singly deployed mobile application using the properties file, based on a Unique Device ID of the mobile device, without the use of the user identity.

2. The method of claim 1, wherein the application policies are obtained from a policy management system of an enterprise mobility management (EMM) computing system.

3. The method of claim 2, wherein the singly deployed mobile application is stored locally on the mobile device and can directly access the different service endpoint destinations without accessing the EMM.

4. The method of claim 1, wherein the context includes mobile application type.

5. The method of claim 1, wherein the service endpoint destinations include QA servers, staging servers, and production servers.

6. The method of claim 1, wherein the singly deployed mobile application is deployed a single time on the mobile device even when there is a client-side problem in production with a specific building code.

7. The method of claim 1, further comprising, upon login:
returning a token based on identification information received from the mobile device deploying the singly deployed mobile application; and
returning an endpoint definition of the service endpoint destinations from a remote computing system based on the returned token.

8. The method of claim 7, wherein the endpoint definition of the service endpoint destinations is returned based on the context.

9. The method of claim 1, wherein the application policies are dynamically applied through dynamic URLs which are hard coded, with the application policies applying a correct hard coded set.

10. The method of claim 1, wherein the properties file list includes all of the service endpoint destinations from QA to production.

11. The method of claim 10, wherein the service endpoint destinations are retrieved from the policy server based on the context.

12. The method of claim 1, wherein the identification information is a Unique Device ID of the mobile device.

13. A computer program product comprising a computer readable storage medium having program instructions embodied therewith, wherein the computer readable storage medium is not a transitory signal per se, and the program instructions are readable by a computing device to cause the computing device to perform a method comprising:
receiving identification information of a mobile device deploying a mobile application a single time on the mobile device during a development lifecycle of the mobile application to provide a singly deployed mobile application;
returning a token based on the identification information received from the mobile device deploying the singly deployed mobile application;
receiving the token and a context in which a user operates from the mobile device; and
providing service endpoint definitions based on the token and the context to allow pointing the singly deployed mobile application to selected different environments in selected ones of the service endpoint definitions during different stages of a development lifecycle of the singly deployed mobile application without recompiling,
wherein the singly deployed mobile application includes a properties file that contains a list of the service endpoint destinations to allow the singly deployed mobile application to directly access the different service endpoint destinations during the development lifecycle of the singly deployed mobile application using the properties file, without going through a management computing system, based on application policies provided by the management computing system to the singly deployed mobile application for determining which service endpoint destinations can be used based on context only, without the use of a user identity, from the list of service endpoint destinations contained in the properties file stored locally on the mobile device,
wherein the identification information is a Unique Device ID of the mobile device, and
further comprising redefining the application policies to change the list of service endpoint destinations that can be used by the user within the property files stored locally on the mobile device, to allow the singly deployed mobile application to directly access the changed service endpoint destinations during the development lifecycle of the singly deployed mobile application using the properties file, based on the Unique Device ID of the mobile device, without the use of the user identity,
wherein the list of the service endpoint destinations accessible by the singly deployed mobile application and included in the property files includes QA servers, staging servers, and production servers.

14. The computer program product of claim 13, wherein the identification information is received by an identity manager.

15. The computer program product of claim 13, wherein the singly deployed mobile application retrieves the service endpoint definitions from a policy server based on at least one of the token and the context.

16. The computer program product of claim 13, wherein the service endpoint definitions are based on the token and the context without the use of a user identity.

17. A system comprising:
a CPU, a computer readable memory and a computer readable storage medium;
program instructions to provide a singly deployed mobile application by deploying a mobile application a single time on a mobile device during a development lifecycle of the singly deployed mobile application; and
program instructions to direct the singly deployed mobile application to selected different environments in different endpoint destinations during a software development lifecycle of the singly deployed mobile application, without recompiling, based on application policies associated with the singly deployed mobile application,
wherein the application policies are provided to the singly deployed mobile application by a policy server in a management computing system and are based on a context in which a user operates, and
wherein the program instructions are stored on the computer readable storage medium for execution by the CPU via the computer readable memory,
wherein the singly deployed mobile application includes a properties file, stored locally on the mobile device, that contains a list of the service endpoint destinations to allow the singly deployed mobile application in the mobile device to directly access the different service endpoint destinations during the development lifecycle of the singly deployed mobile application using the properties file,
wherein the direct access to the different service endpoint destinations is provided via a connection between the mobile device and the different service endpoint destinations which does not include the management computing system,
wherein the singly deployed mobile application uses the application policies provided by the policy server to determine which service endpoint destinations can be used based on context only, without the use of a user identity, from the list of service endpoint destinations contained in the properties file stored locally on the mobile device, and
wherein the context includes mobile application type, time of day and location of the mobile device, so that the time of day and the location of the mobile device determine which of the service endpoint destinations from the list of service endpoint destinations the singly deployed mobile application will be directed to use,
further comprising:
program instructions to redefine the application policies to change the list of service endpoint destinations that can be used by the user within the property files stored locally on the mobile device, and to allow the singly deployed mobile application to directly access the changed service endpoint destinations during the development lifecycle of the singly deployed mobile application using the properties file, based on the Unique Device ID of the mobile device, without the use of the user identity;
program instructions to return a token upon login based on identification information received from the mobile device deploying the singly deployed mobile application; and
program instructions to return an endpoint definition of the service endpoint destinations from a remote computing system based on the returned token,
wherein the endpoint definition of the service endpoint destinations is returned based on the context,
wherein the singly deployed mobile application is deployed a single time on the mobile device even when there is a client-side problem in production with a specific building code,
wherein the properties file list includes all of the service endpoint destinations from QA to production, and
wherein the list of the service endpoint destinations accessible by the singly deployed mobile application and included in the property files includes QA servers, staging servers, and production servers.

18. The system of claim 17, wherein the policies are based on at least one of context and mobile device identification, and the policies provide authorization for the singly deployed mobile application to access selected ones of the different endpoint destinations during the software development lifecycle.

19. The system of claim 17, further comprising program instructions to provide a token based on an identification of the mobile device, wherein the token is used to provide access to selected ones of the different endpoint destinations during the software development lifecycle.

20. The system of claim 17, wherein the application policies are dynamically applied through dynamic URLs which are hard coded, with the application policies applying a correct hard coded set.

21. The system of claim 20, wherein the application policies are obtained from an application policy tool of a management computing system.

22. The system of claim 17, wherein the identification information is a Unique Device ID of the mobile device.

* * * * *